(12) United States Patent
Damle

(10) Patent No.: US 6,761,929 B2
(45) Date of Patent: Jul. 13, 2004

(54) METHOD FOR PREPARATION OF THERMALLY AND MECHANICALLY STABLE METAL/POROUS SUBSTRATE COMPOSITE MEMBRANES

(75) Inventor: Ashok S. Damle, Morrisville, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 10/181,773
(22) PCT Filed: Jan. 22, 2001
(86) PCT No.: PCT/US01/00647
§ 371 (c)(1), (2), (4) Date: Jul. 22, 2002
(87) PCT Pub. No.: WO01/53005
PCT Pub. Date: Jul. 26, 2001

(65) Prior Publication Data
US 2003/0003233 A1 Jan. 2, 2003

Related U.S. Application Data
(60) Provisional application No. 60/177,281, filed on Jan. 21, 2000.

(51) Int. Cl.[7] .............................. B05D 7/22; B05D 3/10; B05D 1/36; B05D 1/18
(52) U.S. Cl. .................. 427/238; 427/304; 427/305; 427/404; 427/405; 427/436; 427/437; 427/438; 427/443.1; 427/376.6; 427/376.7; 427/376.8; 427/383.1; 427/383.3; 427/383.5; 427/383.7
(58) Field of Search ................... 427/238, 304, 427/305, 404, 405, 436, 437, 438, 443.1, 376.6, 376.7, 376.8, 383.1, 383.3, 383.5, 383.7

(56) References Cited

U.S. PATENT DOCUMENTS

| | | | |
|---|---|---|---|
| 4,496,437 A | * | 1/1985 | McIntyre et al. ........... 428/613 |
| 4,568,442 A | * | 2/1986 | Goldsmith ................. 204/284 |
| 5,652,020 A | | 7/1997 | Collins et al. |
| 5,980,989 A | * | 11/1999 | Takahashi et al. .......... 427/294 |

* cited by examiner

Primary Examiner—Michael Barr
(74) Attorney, Agent, or Firm—Oblon, Spivak, McClelland, Maier & Neustadt, P.C.

(57) ABSTRACT

A method is provided for the preparation of metal/porous substrate composite membranes by flowing a solution of metal to be plated over a first surface of a porous substrate and concurrently applying a pressure of gas on a second surface of the porous substrate, such that the porous substrate separates the solution of metal from the gas, and the use of the resulting membrane for the production of highly purified hydrogen gas.

73 Claims, 1 Drawing Sheet

Schematic of the Electroless Deposition Apparatus

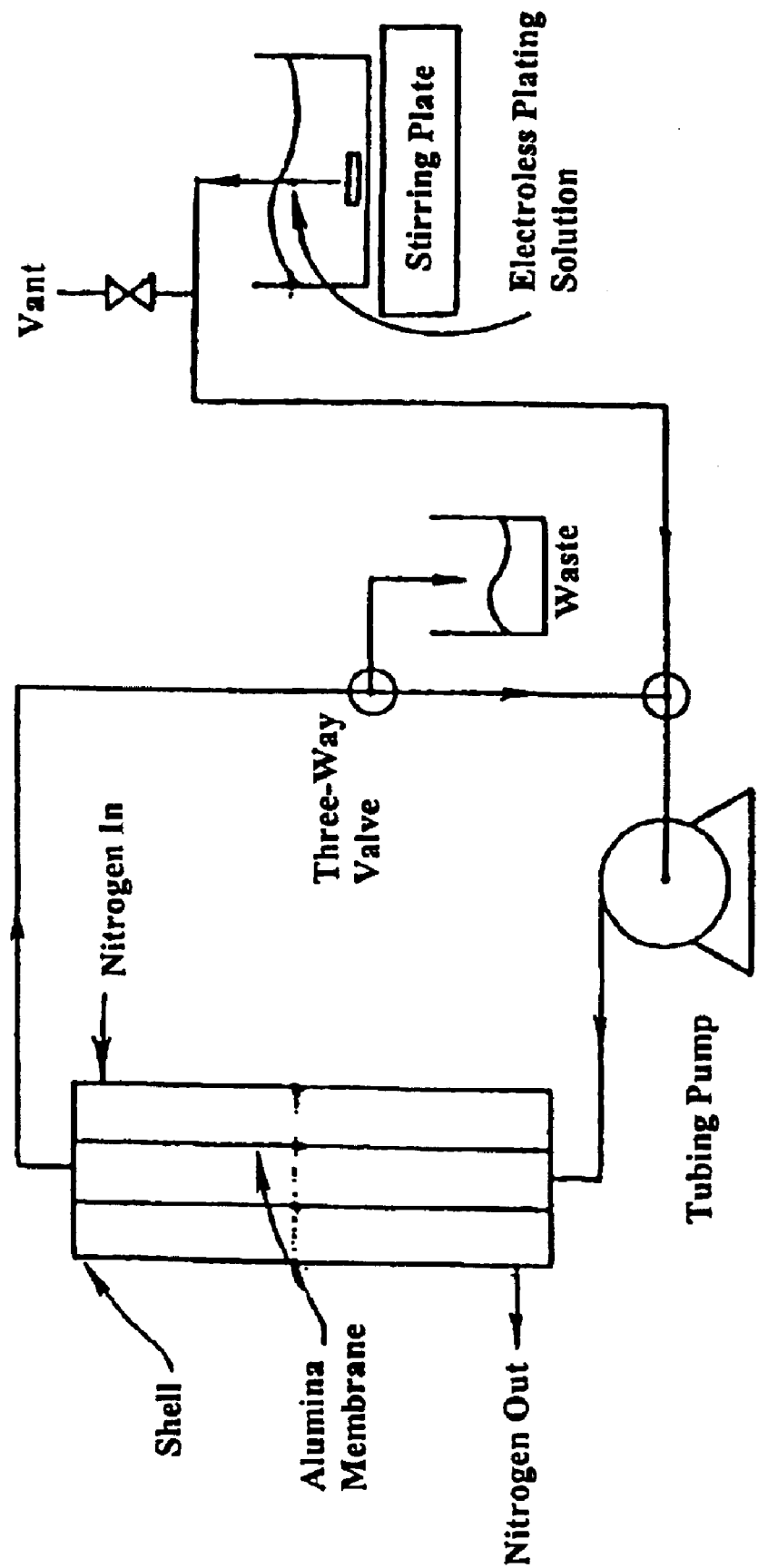

METHOD FOR PREPARATION OF THERMALLY AND MECHANICALLY STABLE METAL/POROUS SUBSTRATE COMPOSITE MEMBRANES

This application claims benefit of Ser. No. 60/177,281 filed Jan. 21, 2000.

The present invention was supported by U.S. Department of Energy Prime Contract No. DE-AC26-98FT40413, and as such the U.S. Government may have certain rights in the present invention.

BACKGROUND OF THE INVENTION

1. Field of the Invention

The present invention relates to a method for preparation of membranes of metal/ceramic composite materials, particularly tubular membranes having high plating uniformity on a production scale.

2. Discussion of the Background

The procedure for electroless plating of palladium on substrates is well developed and involves several steps where the substrate is contacted with various solutions in a certain sequence. The existing technology is based upon immersing appropriate substrates in the plating bath solutions covering areas of the substrate by Teflon tape where plating is not desired. This technique has been used for preparing composite membrane disks [Ilias et al, *Separation Science and Technology*, 32(1–4), pp 487–504, 1997] as well as tubular membranes [Collines and Way, *Ind. Eng. Chem. Res.*, 32 pp 3006–3013, 1993]. In case of disk membranes, one side of the membrane as well as the cylindrical side area is covered by Teflon tape to allow plating on one surface of the disk. In the case of tubular membrane the exterior surface of the tube is covered by tape to allow plating on the inside area of the tube.

The existing technology for electroless plating of palladium is manual and would be difficult to scale up to long commercially available tubular substrates which are typically up to 1 m in length. The plating in such long tubes by the prior art of immersing substrates in solutions is also not likely to be uniform. This technique is only adequate in preparing small samples as described in the above referenced publications. However, a technique amenable to mechanization is needed to prepare large scale membranes for practical applications.

Thin films of palladium allow pure hydrogen ($H_2$) to pass through from a gas stream. Separation and purification of $H_2$ is becoming a focus of many R&D efforts around the world, as energy and environmental issues continue to be at the economic and political forefront.

The thin films of Pd used for $H_2$ separation are typically formed inside of tubular substrates. Past methods for depositing thin films of Pd used electroless plating. This process was never considered ideal, and long tubes (more than 12") were difficult to achieve. The $H_2$ purity would inevitably suffer in the longer tubes because the uniformity of the film thickness could not be controlled.

SUMMARY OF THE INVENTION

Accordingly, one object of the present invention is to provide a method for the preparation of metal/ceramic composite membranes that allows for large scale production with high uniformity in the thin metal layer.

A further object of the present invention is to provide a method for hydrogen separation using the metal/ceramic composite membranes that provides high purity hydrogen production on a large scale.

These and other objects of the present invention have been satisfied by the discovery of a method for producing a metal plated ceramic surface, comprising:

flowing an electroless plating bath solution of metal to be plated over a first surface of a porous substrate, and concurrently applying a pressure of gas on a second surface of the porous substrate opposite to said first surface, such that said ceramic substrate separates the solution of metal from the gas.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein:

The FIGURE provides a schematic drawing of the process of the present invention.

DETAILED DESCRIPTION OF THE PREFERRED EMBODIMENTS

The present invention provides a method for the large scale production of thin, uniform films of metal on a porous substrate, particularly ceramic substrates in the form of long tubes. The present invention can be used to provide the plating of metal films on any shaped substrate. Preferably the substrate is in the form of a cylinder. The cylinder can have any of a variety of cross-sectional shapes, including but not limited to square, rectangular, circular, triangular, various polygonal shapes and irregular shapes. Most preferably, the cylinder is in the form of a long circular cylinder. The porous substrate preferably has pore sizes of 5–200 nm in size, more preferably from 20–100 mn for the outer layer of the substrate in contact with the metal film. The substrate can be any porous material having sufficient thermal and physical stability to withstand the processing temperatures and use temperatures of the final product. Preferably, the substrate is a porous ceramic or porous metal substrate. Suitable ceramic substrates include zirconia, alumina and silica. Suitable porous metal substrates include sintered stainless steel and sintered Ni. Additionally, the porous nature of the substrate can vary through the thickness of the substrate, with the size of the pores at the surface in contact with the thin metal film being important in providing anchoring of the film. The substrate can be a single substance or can be multiple layers of different substances, such as ceramic1-ceramic2- . . . -ceramic3-metal film; metal-ceramic-metal film and many other permutations.

A preferred embodiment of the present invention solves the problem of producing thin, uniform films in long tubes. The membranes of the present invention are thermally and mechanically robust, and have been tested to show an excellent $H_2$ (hydrogen gas) flux rate (volume of $H_2$ permeating per unit area of film per unit time). The present method relies on the use of gas pressure on one side of the substrate to control the plating that is occurring on the other side of the substrate. With a porous substrate, use of a conventional electroless plating process would cause the plating bath solution to pass through the substrate, with metal being deposited throughout in various thicknesses and concentrations. In the present invention, however, the gas pressure is applied to the side of the substrate opposite to the surface being plated in order to control the depth of penetration of the electroless plating bath solution. When the substrate is a tube for example, the metal (such as Pd), prior to plating, is in a solution that is continually flowed through the tube. This flow helps to ensure the uniformity of the metal film that results.

In this preferred embodiment of the present invention, a flow through process is used to circulate the plating bath solutions through the porous tubular substrates. The process is shown schematically in the FIGURE. The porous ceramic substrates were housed in an annular shell which allowed maintaining a certain gas pressure on the shell side of the tubular substrates while the plating solutions flowed on the inside of the tubular substrate. An appropriate gas pressure is essential to prevent breakthroughs of both the gas as well as the liquid phases to the respective other sides. The gas pressure can also be varied to vary the depth of penetration of the plating solutions in the porous substrate cross-section which can influence the mechanical stability of the plating. The continuous circulation of the plating solutions assures the uniformity of the plating as confirmed in the experiments where palladium was plated on alumina as well as zirconia substrates. Since the plating is uniform, a composite membrane prepared by the flow through technique can be thinner compared to one prepared by the conventional immersion technique while still providing defect-free integrity of the plating. This technique can be used for plating palladium or other metals on a variety of substrates.

In the process of the present invention, the gas used can be any inert gas (inert with respect to the plating solution, metal being plated and porous substrate). Preferably, the gas is nitrogen or argon, with nitrogen being most preferred in the plating of palladium. The gas pressure will be varied to control the depth of penetration of the plating solutions in the porous substrate, as noted above. In addition, the pressure is varied depending on the pore size of the porous substrate, with larger pore sizes requiring higher gas pressures to obtain the same level of penetration by the plating metal. For pore sizes ranging from 5 to 200 nm, the gas pressure is preferably from 1 to 5 psig in plating tubular substrates.

In an alternative embodiment the plating solution is passed over the outer surface of the cylindrical ceramic substrate and the inner cavity of the substrate is pressurized with the inert gas. This provides an outer metallic plating of the ceramic substrate.

Any metal capable of being plated by electroless plating can be used in the present invention method. Suitable metals for plating in the present method include any transition metal capable of being plated on the selected substrate, preferably palladium, platinum, gold, silver, nickel, or copper, more preferably palladium.

Also included in the present invention are layers of two or more metals from the above noted metals, as well as multiple layers of different metals. As an example, the substrate can be plated with palladium, followed by a second layer of silver, further followed by a layer of palladium. Once the multiple layers have been formed, the coated substrate can be preferably submitted to an alloying step comprising heating at temperatures sufficient to cause the metals of the multiple layers to migrate from layer to layer and form an alloyed layer. In such an arrangement, the more volatile metal is preferably confined to the middle layer or layers than the outer layer. In a preferred embodiment, the substrate is coated with palladium, followed by silver, followed by an additional layer of palladium. The thus formed triply coated substrate is subjected to temperatures of 500–600 C. for a time of from 1 to 100 h to permit the palladium and silver to form an alloy. The resulting alloyed metal layer can provide even further improvements in membrane properties. Such alloyed metal layers can include any desired range of metal composition, with the primary component being from 20 to 95% of the alloyed composition by weight.

The flow through velocity of the plating solution should be from 0.5 to 5.0 cm/sec, preferably 1–3 cm/sec, most preferably 2 cm/sec. The plating solution can be at any desired concentration so long as a consistent mixture can be maintained (i.e. no excessive settling or separation occurs). Conventional electroless plating solutions are used, using concentrations of the metal or metal salt conventionally used in electroless plating. Preferably, in the preferred embodiment for plating Pd, the plating solution has a concentration of 5 g of PdCl per liter of solution. The plating solution further contains a reducing agent. Ideally, the solution can be in water, but any solvent capable of delivering the metal to the ceramic substrate surface is acceptable. The metals used in electroless plating are normally in the form of salts, commonly known in the art. For example, when Pd is the metal to be plated, the plating solution bath contains a $Pd(NH_3)_2$-EDTA complex, to which a reducing agent is added to begin reduction of the metal to $Pd^0$ which is plated onto the substrate.

The electroless plating reaction can be performed at any desired temperature, preferably at a temperature of from 20 to 60° C.

The gas applied to the side of the tube opposite the side being plated must be at a pressure sufficient to maintain separation of the gas and liquid phases on the opposite sides of the tube. The gas should be inert with respect to the substrate, plating solution, and the metal being plated. Preferably the gas is nitrogen or argon.

In conventional Pd tubes, the tube is required to have a thickness of at least 100 mil for handleability. However, in the present invention, it is possible to use an inexpensive ceramic or porous metal substrate on which a thin film of metal (such as Pd) is formed. The use of the ceramic or porous metal substrate provides structural integrity at much reduced cost, due to the small amount of Pd needed. The preferred thickness of the Pd film of the preferred embodiment is from 1–2 $\mu$. This thin layer of Pd also provides remarkable increases in the gas flux rate compared to conventional all Pd tubes.

The present invention provides a thin and uniform membrane of a metal (such as Pd) deposited upon a porous substrate. This allows a higher flux rate of pure $H_2$ (rate of passage of $H_2$ through the membrane). This higher flux rate of $H_2$ provides both a cost reduction and performance improvement over existing technology for the separation and purification of $H_2$.

The attention being received by fuel cells and fuel processors at present is what makes the present invention so important. The U.S. economy is expected to slowly shift from an internal combustion engine (ICE) driven technology to a fuel cell technology, primarily for environmental reasons. Fuel cell vehicles will require large supplies of $H_2$, either supplied as a compressed gas or formed "on-board" using a processor for conventional fuels, such as gasoline. Either method is far superior to the ICE in terms of greenhouse gas emissions (of concern is primarily $CO_2$).

A number of porous ceramic substrates were evaluated in the experimental work which revealed suitability of certain substrates to produce thermally and mechanically stable palladium plating films.

Having generally described this invention, a further understanding can be obtained by reference to certain specific examples which are provided herein for purposes of illustration only and are not intended to be limiting unless otherwise specified.

EXAMPLES

Palladium was plated on the insider surface of ceramic tubes using the above described process. The substrates were 10 mm OD and 250 mm long α-alumina tubes obtained from U.S. Filter Corporation. The tubes are commercially available as microfiltration "Membralox" elements. These elements are typically of an asymmetric structure with a coarse α-alumina outer tube and one or more fine pore size layers on the inside surface depending upon the pore size of the rating of the tubular element. The plating was applied on tubular elements of different pore size ratings including 5 nm, 20 nm, 50 nm, 100 nm, and 200 nm. The 20 nm and 50 nm pore size elements contain an innermost layer of zirconia, the 5 nm pore size element contains an innermost layer of γ-alumina, whereas the 100 and 200 nm elements contain an innermost layer of α-alumina. Thus, in effect, this process was demonstrated with three different ceramic materials as substrates.

A standard electroless plating process as reported in literature was used for palladium plating consisting of three steps: Cleaning of the substrate, sensitization and activation of the substrate surface, and electroless palladium plating. The substrates were first cleaned by circulating 0.1 N sodium hydroxide through the substrate tube for 15 minutes followed by circulating 0.1 N hydrochloric acid solution through the tube for 15 minutes, followed by circulating deionized water through the tube for 15 minutes. About 250 mL of each solution was used for each component and the circulation rate was approximately 50 ml/min. The substrate was then sensitized using 1 g/l solution of tin chloride in 0.2 N hydrochloric acid and activated using 0.09 g/l solution of palladium chloride in 0.2 N hydrochloric acid. For the sensitization and activation process, the sensitization solution was first circulated through the substrate tube for 5 minutes, followed by circulation of the activation solution for 5 minutes, followed by circulation of deionized water for 1 minute. The sensitization/activation process was repeated 4 times. The substrate was then dried in an oven at 120° C. for two hours and weighed.

A standard electroless plating bath composition reported in literature was used for palladium plating on the alumina substrates and consisted of 5.4 g/l of palladium chloride, 390 ml/l of 5N ammonium hydroxide solution, 40 g/l of ethylene diamine tetraacetic acid, and 10 ml/l of 1M hydrazine solution. About 185 ml of the bath composition was prepared for a single plating of palladium on a single tubular element. All components were mixed together first, except for the hydrazine, which was added just before starting the circulation of the plating solution. The plating bath solution was circulated at a rate of approximately 50 cc/min. The corresponding velocity of the solution in the tube was about 2 cm/sec. The circulation was continued for 1.5 hours at ambient temperature of 22° C. The substrate was then rinsed by circulating deionized water for 10 minutes, dried in an oven at 120° C. for two hours, and weighed. The electroless plating process can be repeated as many times as desired to obtain the desired palladium film thickness. The gas used on the outside surface of the substrates was nitrogen at a pressure ranging from 1 to 5 psig, with lower pressures used for the smaller pore size substrates and higher pressures used for the higher pore size substrates.

Uniform palladium deposition was observed on all substrates. A single plating operation with palladium for 1.5 hours as described above gave a palladium film of approximately 0.5 microns thickness. The film was observed to be solid, continuous, and without pinholes, as confirmed by scanning electron microscopy.

The process of the present invention has also been used to deposit silver films on similar substrates.

Obviously, additional modifications and variations of the present invention are possible in light of the above teachings. It is therefore to be understood that within the scope of the appended claims, the invention may be practiced otherwise than as specifically described herein.

What is claimed is:

1. A method for producing a metal plated porous substrate, comprising:
    flowing a solution of metal to be plated over a first surface of a porous substrate with pores having a diameter in a range from 5 to 200 nanometers and
    concurrently applying a pressure of gas on a second surface of the porous substrate opposite to said first surface, such that said porous substrate separates the solution of metal from the gas.

2. The method of claim 1, wherein said porous substrate is a made of a material selected from the group consisting of ceramics and porous metals.

3. The method of claim 2, wherein said porous substrate is a ceramic substrate.

4. The method of claim 2, wherein said porous substrate is a porous metal substrate.

5. The method of claim 1, wherein said porous substrate is a cylindrical substrate having an inner surface and an outer surface.

6. The method of claim 5, wherein said inner surface is said first surface and said outer surface is said second surface.

7. The method of claim 5, wherein said outer surface is said first surface and said inner surface is said second surface.

8. The method of claim 3, wherein said ceramic substrate is made of a ceramic material selected from the group consisting of zirconia, alumina and silica.

9. The method of claim 8, wherein said ceramic substrate is a zirconia subtrate.

10. The method of claim 8, wherein said ceramic substrate is an alumina substrate.

11. The method of claim 4, wherein said porous metal substrate is made of a porous metal selected from the group consisting of sintered stainless steel and sintered Ni.

12. The method of claim 1, wherein said metal is a member selected from the group consisting of palladium, platinum, gold, silver, nickel and copper.

13. The method of claim 12, wherein said metal is palladium or silver.

14. The method of claim 12, wherein said metal is palladium.

15. The method of claim 6, wherein said metal is palladium, and said substrate is zirconia.

16. The method of claim 6, wherein said metal is palladium and said substrate is alumina.

17. The method of claim 1, wherein prior to said flowing step, the process further comprises:
    cleaning the substrate; and
    sensitizing and activating the substrate.

18. The method of claim 17, wherein said cleaning step is performed by circulating a sodium hydroxide solution over the substrate, followed by circulating a hydrochloric acid solution over the substrate, followed by circulating deionized water over the substrate.

19. The method of claim 17, wherein said sensitizing and activating step is performed by circulating an acidic tin chloride solution over the substrate, followed by circulating an acidic solution of a salt of the metal to be plated over the substrate, followed by circulating deionized water over the substrate.

20. The method of claim 1, wherein said solution of metal to be plated comprises an aqueous solution of palladium chloride, ammonium hydroxide, ethylene diamine tetraacetic acid and hydrazine.

21. The method of claim 1, further comprising repeating said method to apply one or more additional layers of metal onto said substrate, wherein said one or more additional layers can be the same metal contained in said solution, or a different metal than that contained in said solution.

22. The method of claim 21, further comprising, after said one or more additional layers of metal have been applied to said substrate, alloying all metal layers to form an alloyed layer.

23. A method for producing a metal plated porous substrate, comprising:
flowing a solution of metal to be plated over a first surface of a porous ceramic substrate and
concurrently applying a pressure of gas on a second surface of the porous ceramic substrate opposite to said first surface, such that said porous ceramic substrate separates the solution of metal from the gas.

24. The method of claim 23, wherein said porous ceramic substrate is a cylindrical ceramic substrate having an inner surface and an outer surface.

25. The method of claim 24, wherein said inner surface is said first surface and said outer surface is said second surface.

26. The method of claim 24, wherein said outer surface is said first surface and said inner surface is said second surface.

27. The method of claim 23, wherein said ceramic substrate is made of a ceramic material selected from the group consisting of zirconia, alumina and silica.

28. The method of claim 27, wherein said ceramic substrate is a zirconia subtrate.

29. The method of claim 27, wherein said ceramic substrate is an alumina substrate.

30. The method of claim 23, wherein said metal is a member selected from the group consisting of palladium, platinum, gold, silver, nickel and copper.

31. The method of claim 30, wherein said metal is palladium or silver.

32. The method of claim 31, wherein said metal is palladium.

33. The method of claim 23, wherein said metal is palladium, and said ceramic substrate is zirconia.

34. The method of claim 23, wherein said metal is palladium and said ceramic substrate is alumina.

35. The method of claim 23, wherein prior to said flowing step, the process further comprises:
cleaning the ceramic substrate; and
sensitizing and activating the ceramic substrate.

36. The method of claim 35, wherein said cleaning step is performed by circulating a sodium hydroxide solution over the ceramic substrate, followed by circulating a hydrochloric acid solution over the ceramic substrate, followed by circulating deionized water over the ceramic substrate.

37. The method of claim 35, wherein said sensitizing and activating step is performed by circulating an acidic tin chloride solution over the ceramic substrate, followed by circulating an acidic solution of a salt of the metal to be plated over the ceramic substrate, followed by circulating deionized water over the ceramic substrate.

38. The method of claim 23, wherein said solution of metal to be plated comprises an aqueous solution of palladium chloride, animonium hydroxide, ethylene diamine tetraacetic acid and hydrazine.

39. The method of claim 23, further comprising repeating said method to apply one or more additional layers of metal onto said ceramic substrate, wherein said one or more additional layers can be the same metal contained in said solution, or a different metal than that contained in said solution.

40. The method of claim 39, further comprising, after said one or more additional layers of metal have been applied to said ceramic substrate, alloying all metal layers to form an alloyed layer.

41. A method for producing a metal plated porous substrate, comprising:
flowing a solution of metal to be plated over a first surface of a porous substrate, wherein said porous substrate is a cylindrical substrate having an inner surface and an outer surface and
concurrently applying a pressure of gas on a second surface of the porous substrate opposite to said first surface, such that said porous substrate separates the solution of metal from the gas.

42. The method of claim 41, wherein said porous substrate is a made of a material selected from the group consisting of ceramics and porous metals.

43. The method of claim 42, wherein said porous substrate is a ceramic substrate.

44. The method of claim 42, wherein said porous substrate is a porous metal substrate.

45. The method of claim 41, wherein said inner surface is said first surface and said outer surface is said second surface.

46. The method of claim 41, wherein said outer surface is said first surface and said inner surface is said second surface.

47. The method of claim 43, wherein said ceramic substrate is made of a ceramic material selected from the group consisting of zirconia, alumina and silica.

48. The method of claim 47, wherein said ceramic substrate is a zirconia subtrate.

49. The method of claim 47, wherein said ceramic substrate is an alumina substrate.

50. The method of claim 44, wherein said porous metal substrate is made of a porous metal selected from the group consisting of sintered stainless steel and sintered Ni.

51. The method of claim 41, wherein said metal is a member selected from the group consisting of palladium, platinum, gold, silver, nickel and copper.

52. The method of claim 51, wherein said metal is palladium or silver.

53. The method of claim 51, wherein said metal is palladium.

54. The method of claim 45, wherein said metal is palladium, and said substrate is zirconia.

55. The method of claim 45, wherein said metal is palladium and said substrate is alumina.

56. The method of claim 41, wherein prior to said flowing step, the process further comprises:
cleaning the substrate; and
sensitizing and activating the substrate.

57. The method of claim 56, wherein said cleaning step is performed by circulating a sodium hydroxide solution over the substrate, followed by circulating a hydrochloric acid solution over the substrate, followed by circulating deionized water over the substrate.

58. The method of claim 56, wherein said sensitizing and activating step is performed by circulating an acidic tin chloride solution over the substrate, followed by circulating an acidic solution of a salt of the metal to be plated over the substrate, followed by circulating deionized water over the substrate.

59. The method of claim 41, wherein said solution of metal to be plated comprises an aqueous solution of palladium chloride, ammonium hydroxide, ethylene diamine tetraacetic acid and hydrazine.

60. The method of claim 41, further comprising repeating said method to apply one or more additional layers of metal onto said substrate, wherein said one or more additional layers can be the same metal contained in said solution, or a different metal than that contained in said solution.

61. The method of claim 60, further comprising, after said one or more additional layers of metal have been applied to said substrate, alloying all metal layers to form an alloyed layer.

62. A method for producing a metal plated porous substrate, comprising:
  flowing a solution of metal to be plated over a first surface of a porous substrate, wherein said porous substrate comprises a layer of porous ceramic on a layer of porous metal and
  concurrently applying a pressure of gas on a second surface of the porous substrate opposite to said first surface, such that said porous substrate separates the solution of metal from the gas.

63. The method of claim 62, wherein said porous substrate is a cylindrical substrate having an inner surface and an outer surface.

64. The method of claim 63, wherein said inner surface is said first surface and said outer surface is said second surface.

65. The method of claim 64, wherein said first surface is said layer of porous metal and said second surface is said porous ceramic.

66. The method of claim 64, wherein said first surface is said layer of porous ceramic and said second surface is said porous metal.

67. The method of claim 63, wherein said outer surface is said first surface and said inner surface is said second surface.

68. The method of claim 67, wherein said first surface is said layer of porous metal and said second surface is said porous ceramic.

69. The method of claim 67, wherein said first surface is said layer of porous ceramic and said second surface is said porous metal.

70. The method of claim 62, wherein said porous ceramic is made of a ceramic material selected from the group consisting of zirconia, alumina and silica.

71. The method of claim 62, wherein said porous metal is a member selected from the group consisting of sintered stainless steel and sintered Ni.

72. The method of claim 62, wherein said metal is a member selected from the group consisting of palladium, platinum, gold, silver, nickel and copper.

73. The method of claim 62, wherein prior to said flowing step, the process further comprises:
  cleaning the substrate; and
  sensitizing and activating the substrate.

* * * * *

UNITED STATES PATENT AND TRADEMARK OFFICE
CERTIFICATE OF CORRECTION

PATENT NO. : 6,761,929 B2
DATED : July 13, 2004
INVENTOR(S) : Ashok S. Damle

It is certified that error appears in the above-identified patent and that said Letters Patent is hereby corrected as shown below:

Column 8,
Line 7, delete "animonium" and "ammonium"

Signed and Sealed this

Twenty-first day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,761,929 B2
DATED : July 13, 2004
INVENTOR(S) : Ashok S. Damle

It is certified that error appears in the above-identified patent and that said Letters Patent is hereby corrected as shown below:

Column 8,
Line 7, delete "animonium" and insert -- ammonium --.

Signed and Sealed this

Thirtieth Day of August, 2005

JON W. DUDAS
*Director of the United States Patent and Trademark Office*